United States Patent
Thirumalai et al.

(10) Patent No.: US 9,930,346 B2
(45) Date of Patent: Mar. 27, 2018

(54) SYSTEM AND METHOD FOR FLATNESS DETECTION FOR DISPLAY STREAM COMPRESSION (DSC)

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 14/685,479

(22) Filed: Apr. 13, 2015

(65) Prior Publication Data

US 2015/0296209 A1   Oct. 15, 2015

Related U.S. Application Data

(60) Provisional application No. 61/979,980, filed on Apr. 15, 2014, provisional application No. 62/034,693, (Continued)

(51) Int. Cl.
*H04N 19/00* (2014.01)
*H04N 19/176* (2014.01)
(Continued)

(52) U.S. Cl.
CPC ......... *H04N 19/176* (2014.11); *H04N 19/115* (2014.11); *H04N 19/124* (2014.11); *H04N 19/14* (2014.11)

(58) Field of Classification Search
CPC .. H04N 19/176; H04N 19/115; H04N 19/124; H04N 19/14
(Continued)

(56) References Cited

U.S. PATENT DOCUMENTS

| | | | | |
|---|---|---|---|---|
| 5,440,344 A | * | 8/1995 | Asamura | H04N 19/88 375/240.01 |
| 5,835,149 A | * | 11/1998 | Astle | H04N 19/172 375/240.05 |

(Continued)

FOREIGN PATENT DOCUMENTS

EP   1083751 A1   3/2001

OTHER PUBLICATIONS

International Search Report and Written Opinion—PCT/US2015/025744—ISA/EPO—Dec. 10, 2015.
(Continued)

*Primary Examiner* — Jeffery Williams
(74) *Attorney, Agent, or Firm* — Knobbe, Martens, Olson & Bear, LLP

(57) ABSTRACT

A system and method for flatness detection for display stream compression (DSC) is disclosed. In one aspect, the method includes determining a first complexity value for a previous block of video data, a second complexity value for a current block of the video data, and a third complexity value for a next block of the video data. The method also includes determining whether the current block includes a transition from a complex region to a flat region based at least in part on the first, second, and third complexity values.

28 Claims, 7 Drawing Sheets

Related U.S. Application Data filed on Aug. 7, 2014, provisional application No. 62/093,381, filed on Dec. 17, 2014.

(51) Int. Cl.
*H04N 19/124* (2014.01)
*H04N 19/115* (2014.01)
*H04N 19/14* (2014.01)

(58) Field of Classification Search
USPC .................................................. 375/240.18
See application file for complete search history.

(56) References Cited

U.S. PATENT DOCUMENTS

| | | |
|---|---|---|
| 6,463,100 B1 | 10/2002 | Cho et al. |
| 2006/0088105 A1* | 4/2006 | Shen ............... H04N 19/197 375/240.21 |
| 2010/0309985 A1* | 12/2010 | Liu ...................... H04N 19/46 375/240.25 |
| 2012/0281756 A1 | 11/2012 | Roncero et al. |
| 2014/0092957 A1 | 4/2014 | MacInnis |

OTHER PUBLICATIONS

Walls F., et al., "BDC-1: A Robust Algorithm for Display Stream Compression", 2013 Picture Coding Symposium (PCS), IEEE, Dec. 8, 2013 (Dec. 8, 2013), pp. 434-437, XP032567035, DOI: 10.1109/PCS.2013.6737776 [retrieved on Feb. 11, 2014], pp. 434-437, figure 2.

Walls F., et al., "VESA Display Stream Compression", Mar. 3, 2014 (Mar. 3, 2014), pp. 1-5, XP002751573, Retrieved from the Internet: URL: http ://www.vesa.org/wp-content/uploads/2014/04/VESA_DSC-ETP200.pdf [retrieved on Nov. 27, 2015].

\* cited by examiner

SYSTEM AND METHOD FOR FLATNESS DETECTION FOR DISPLAY STREAM COMPRESSION (DSC)

INCORPORATION BY REFERENCE TO PRIORITY APPLICATIONS

This application claims the benefit of U.S. Provisional Application No. 61/979,980, filed Apr. 15, 2014, U.S. Provisional Application No. 62/034,693, filed Aug. 7, 2014, and U.S. Provisional Application No. 62/093,381, filed Dec. 17, 2014.

TECHNICAL FIELD

This disclosure relates to the field of video coding and compression, and particularly to video compression for transmission over display links, such as display stream compression (DSC).

BACKGROUND

Description of the Related Art

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., good enough that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, a method for coding video data comprises determining a first complexity value for a previous block of the video data, a second complexity value for a current block of the video data, and a third complexity value for a next block of the video data, the first, the second, and the third complexity values being representative of at least one of a texture or a spatial frequency of the corresponding one of the previous block, the current block, and the next block of the video data; determining whether the current block includes a transition from a complex region to a flat region based at least in part on the first, the second, and the third complexity values, wherein complex regions have complexity values that meet or exceed a complexity threshold and flat regions have complexity values that are less than the complexity threshold; and coding the video data based at least in part on the determination of whether the current block includes the transition from the complex region to the flat region.

In another aspect, a device for coding video data comprises a memory configured to store the video data; and a processor in communication with the memory and configured to: determine a first complexity value for a previous block of the video data, a second complexity value for a current block of the video data, and a third complexity value for a next block of the video data, the first, the second, and the third complexity values being representative of at least one of a texture or a spatial frequency of the corresponding one of the previous block, the current block, and the next block of the video data; determine whether the current block includes a transition from a complex region to a flat region based at least in part on the first, the second, and the third complexity values, wherein complex regions have complexity values that meet or exceed a complexity threshold and the flat regions have complexity values that are less than the complexity threshold; and code the video data based at least in part on the determination of whether the current block includes the transition from the complex region to the flat region.

In yet another aspect, an apparatus comprises means for determining a first complexity value for a previous block of video data, a second complexity value for a current block of the video data, and a third complexity value for a next block of the video data, the first, the second, and the third complexity values being representative of at least one of a texture or a spatial frequency of the corresponding one of the previous block, the current block, and the next block of the video data; and means for determining whether the current block includes a transition from a complex region to a flat region based at least in part on the first, the second, and the third complexity values, wherein complex regions have complexity values that meet or exceed a complexity threshold and flat regions have complexity values that are less than the complexity threshold.

In still yet another aspect, a non-transitory computer readable storage medium has stored thereon instructions that, when executed, cause a processor of a device to determine a first complexity value for a previous block of video data, a second complexity value for a current block of the video data, and a third complexity value for a next block of the video data, the first, the second, and the third complexity values being representative of at least one of a texture or a spatial frequency of the corresponding one of the previous block, the current block, and the next block of the video data; and determine whether the current block includes a transition from a complex region to a flat region based at least in part on the first, the second, and the third complexity values, wherein complex regions have complexity values that meet or exceed a complexity threshold and flat regions have complexity values that are less than the complexity threshold.

DETAILED DESCRIPTION

Figure 1A:
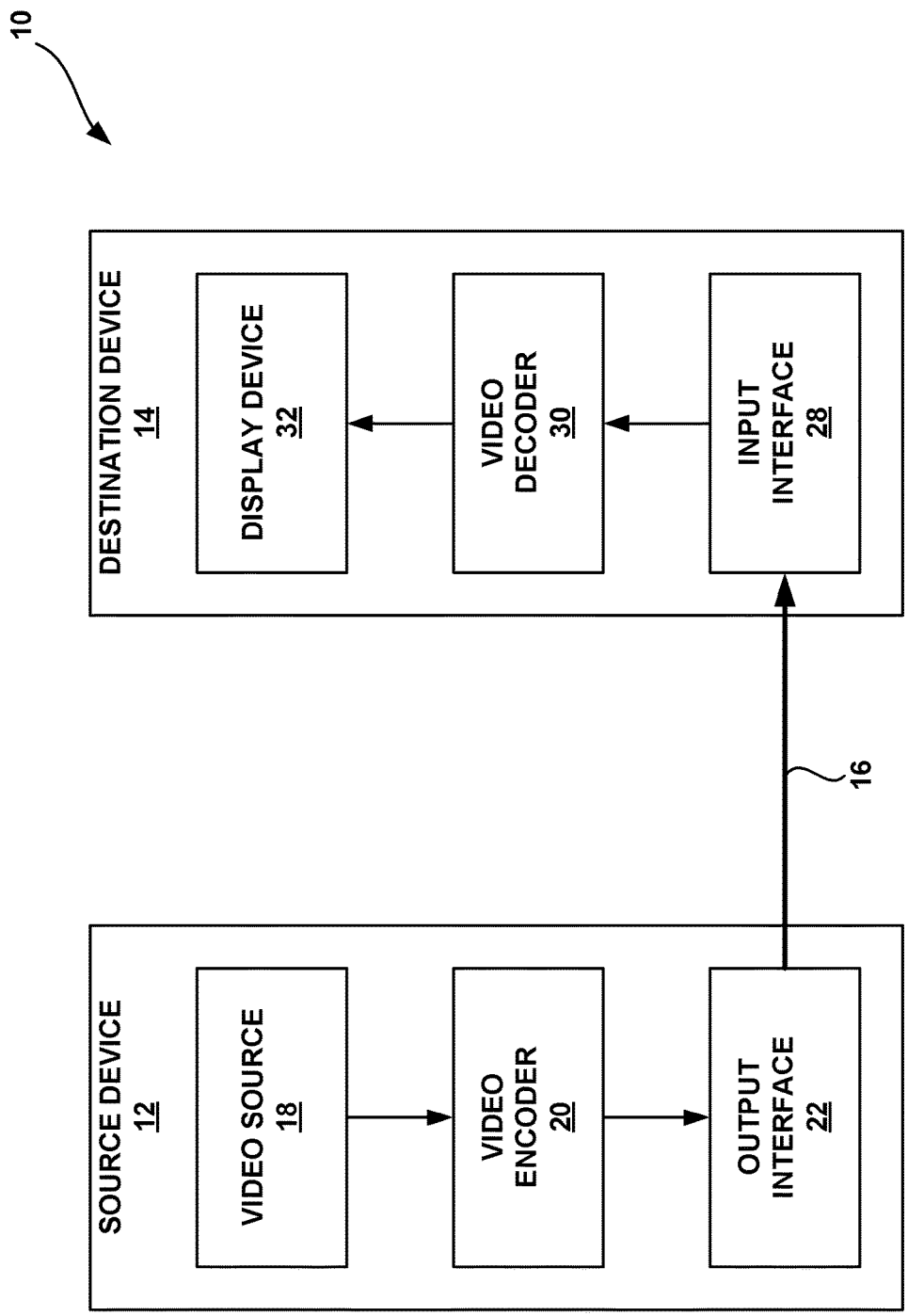
FIG. 1A is a block diagram illustrating an example video encoding and decoding system that may utilize techniques in accordance with aspects described in this disclosure.

In general, this disclosure relates to methods of flatness detection in video data in the context of video compression techniques such as display stream compression (DSC). More specifically, the present disclosure relates to systems and methods for identifying a transitional block within video data within which a transition from a complex region of the video data to a flat region of the video data occurs.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and High Efficiency Video Coding (HEVC), and extensions of such standards. Also, the techniques described in this disclosure may become part of standards developed in the future. In other words, the techniques described in this disclosure may be applicable to previously developed video coding standards, video coding standards currently under development, and forthcoming video coding standards.

The DSC standard includes the detection of transitions in video data from complex regions to flat regions and from flat regions to complex regions. Such transitions in the flatness of the video data may be used by DSC to determine coding parameters used in coding the video data. These coding parameters are determined, in part, such that the compressed video meets the DSC standard's bandwidth requirements while minimizing distortion in the video.

Video compression techniques, such as DSC, may include flatness detection in order to detect the transition from a complex region of the video data to a flat region of the video data. In some methods of flatness detection, each group of the video data or block of the video data is signaled via an associated parameter in the bitstream which defines whether the group is "complex" or "flat," and further, when signaled as flat, the type of flatness is signaled as to whether the group is somewhat flat or very flat. Accordingly, the signaled information may increase the data included in the compressed video data. Further, these flatness detection techniques may be based on the maximum and minimum values of the pixels under consideration (e.g., the previous pixel, current group of pixels, and/or next group of pixels). As such, these flatness detection techniques may not scale well to larger group or block sizes since the maximum and minimum values may not capture information regarding, for example, local variations within the group, and as such, may not adequately represent the flatness of the group.

Accordingly, at least one aspect of this disclosure relates to a flatness detection method which includes a complexity calculation of each of a previous block, a current block, and a next block of the video data. The flatness of the current block may be determined based on the complexities of the previous, current, and next blocks. For example, the flatness may be a measure of the texture and/or spatial frequency of the current block. Accordingly, it may be possible to scale the block size while adequately capturing information relating to local variations in the blocks. Further, a transitional block may be identified where the transition from a complex region to a flat region occurs.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links. The DSC 1.0 standard was published in 2014 by VESA. Further advances to the DSC are currently being considered.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
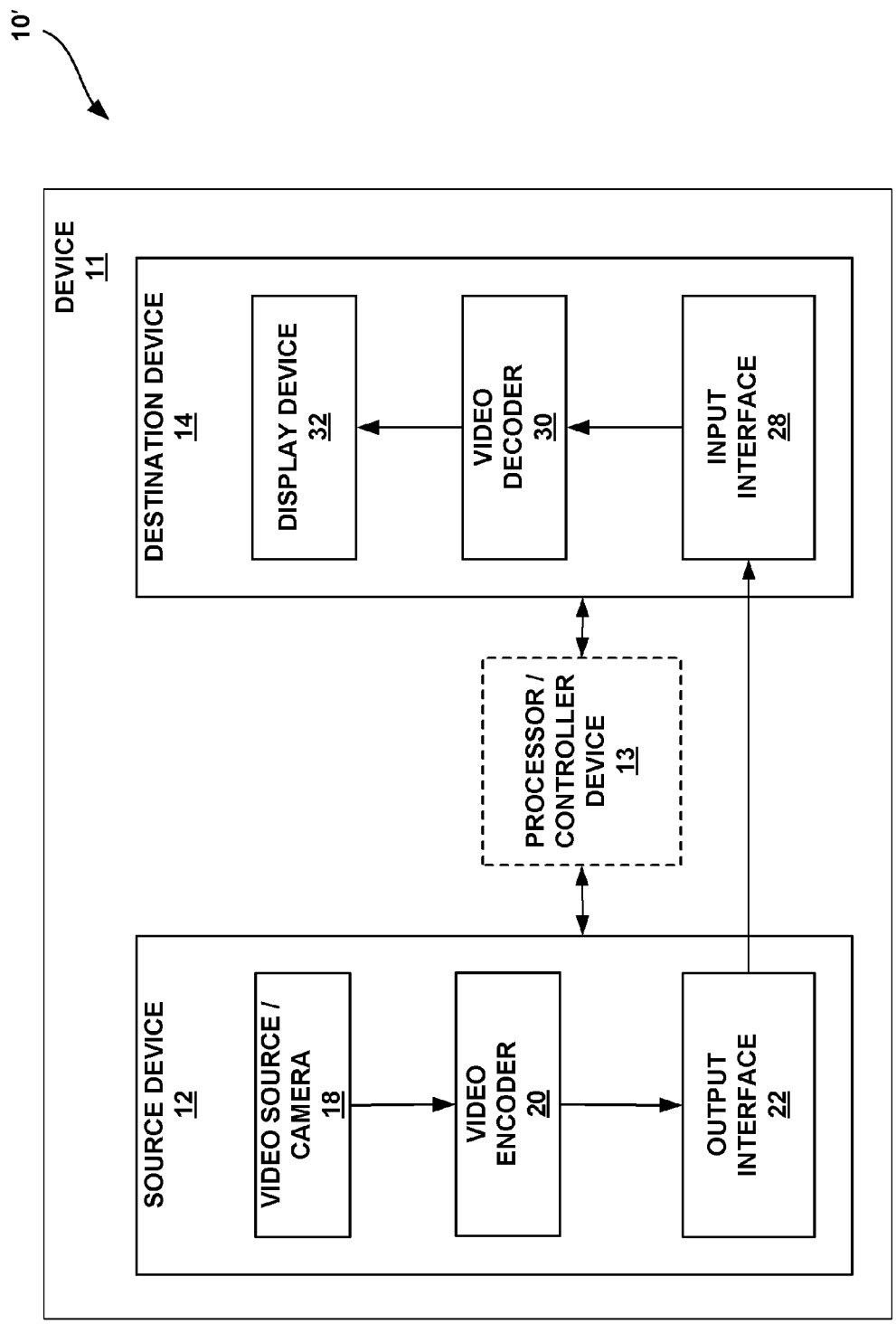
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, and AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or it may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
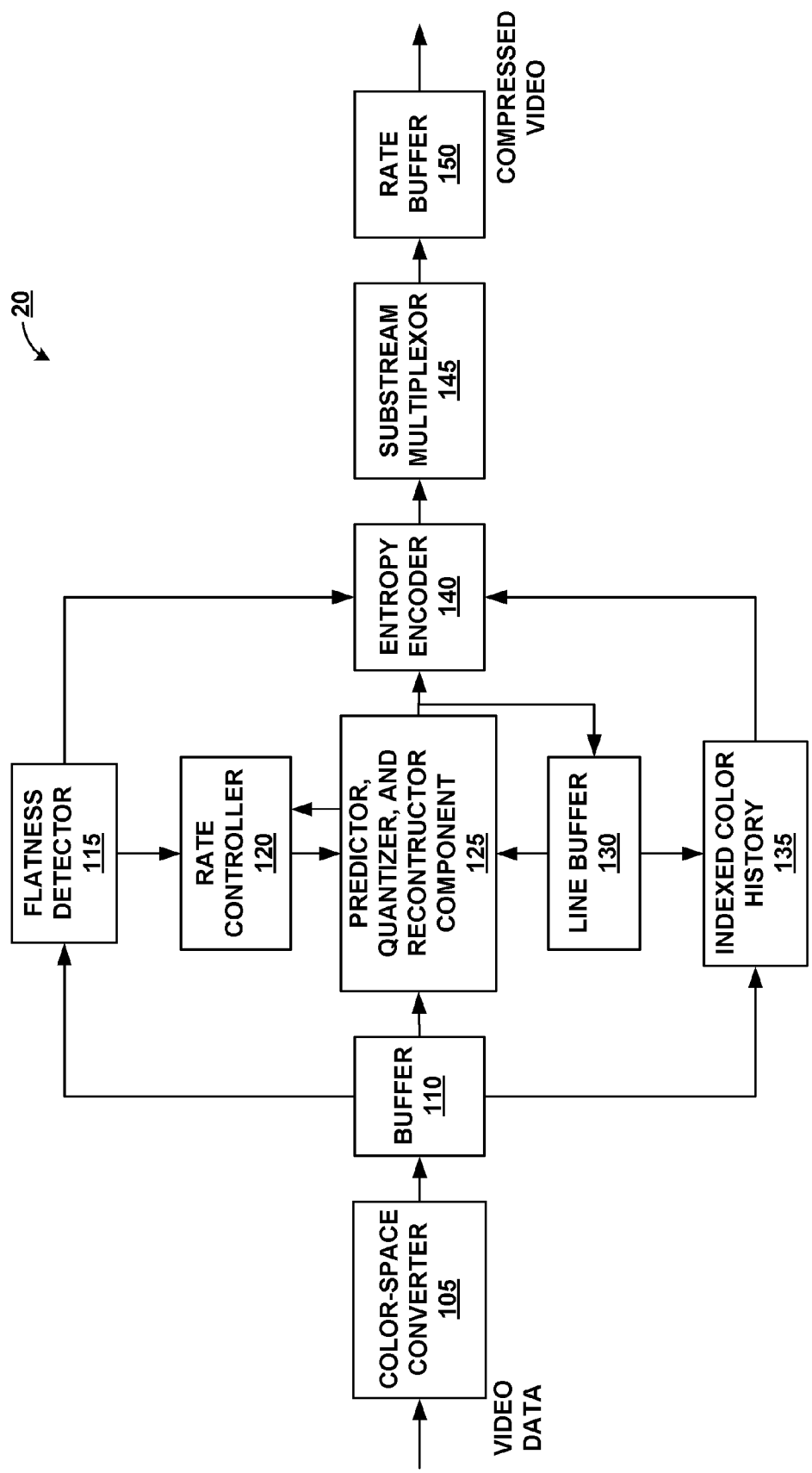
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to the use of the color-space converted video data by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a constant bit rate (CBR) buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the rate buffer 150 and BufferMaxSize representing the size of the rate buffer 150, i.e., the maximum number of bits that can be stored in the rate buffer 150 at any point in time. The BF may be calculated as:

$$BF=((BufferCurrentSize*100)/BufferMaxSize)$$

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term "complex" as used herein generally describes a region of the video data as being complex or difficult for the video encoder 20 to encode and may, for example, include textured video data, high spatial frequency, and/or other features which are complex to encode. For example, a region of the video data may be determined to be a complex region when the number of bits required to encode the region are greater than a threshold. The term "flat" as used herein generally describes a region of the video data as being simple for the video encoder 20 to encoder and may, for example, include a smooth gradient in the video data, low spatial frequency, and/or other features which are simple to encode. For example, a region of the video data may be determined to be a flat region when the number of bits required to encode the region are less than the threshold.

However, depending on the implementation, the determination of whether a given region is complex or flat may also be determined based on the encoding standard used, the specific hardware included in the video encoder 20, the type of video data to be encoded, etc. Further, certain properties of the video data regions may influence how many bits are required to encode the region, for example, high texture and/or high spatial frequency regions may require more bits to be encoded than lower texture and/or lower spatial frequency regions. Similarly, regions comprising random noise may be require a large number of bits to be encoded compared to more structured regions of the video data. Thus, in certain implementations, regions of the video data may be identified as complex and/or flat regions by comparing a measure of the texture and/or spatial frequency (e.g., a complexity value) to a complexity threshold. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified. A more detailed description of flatness detection and various embodiments thereof are provided below.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that the distortion satisfies the bit-rate constraint, i.e., the overall actual coding rate fits within the target bit rate.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels to the left. The video encoder 20 and the video decoder 30 can both perform an identical search on reconstructed pixels to determine the block prediction usages, and thus, no bits need to be sent in the block prediction mode. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
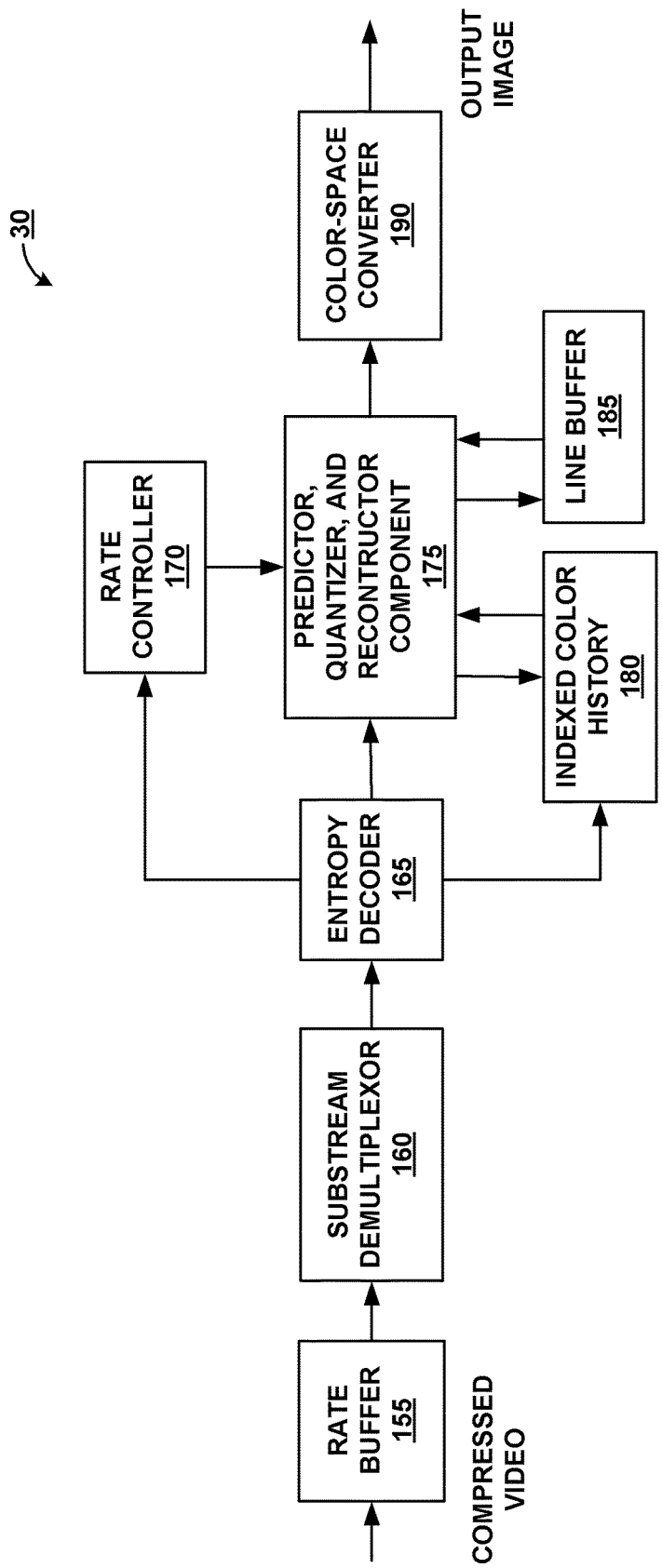
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video encoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Slices in DSC

As noted above, a slice generally refers to a spatially distinct region in an image or a frame that can be decoded independently without using the information from the rest of the regions in the image or frame. Each image or video frame may be encoded in a single slice or the image or the video frame may be encoded in several slices. In DSC, the target bits allocated to encode each slice may be substantially constant.

Flatness Detection

One technique for flatness detection may involve identifying the transition from a complex region to a flat region. In some implementations, the rate control algorithm, which may be performed by the rate controller 120, includes selecting a QP value for a current block based at least in part on a bit rate of a previous block. When the bit rate of the previous block is higher than an average bitrate of the previously encoded blocks (e.g., due to high activity), the rate control algorithm increases the QP value of the current block in order to maintain the bit-rate constraint and also to prevent rate buffer 150 overflow. Therefore, the QP value of the current block may reach a very high value, when a number of consecutive previously encoded blocks are highly complex. When a flat region follows right after a complex region, visual artifacts may be noticeable if the flat region is encoded with a high QP. Therefore, it may be desirable to identify this transition from a complex region of video data to a flat region of video data so that the encoding of the flat region can be performed using a low QP value.

In some implementations, flatness determination is performed for each group or block (e.g., 3 pixels) within a supergroup (e.g., 4 consecutive groups/blocks). Two flatness checks may be performed to determine the type of flatness which may be "not flat," "somewhat flat," or "very flat". For each supergroup having a size of 4 groups as in the previous example, therefore, there may be four flatness indications, one for each group/block. Each flatness indication may indicate, for example, that the corresponding group-block is not flat, somewhat flat, or very flat. In some embodiments, a somewhat flat block may be determined to be a region of the video data that is more complex or difficult to encode than a very flat region and more simple to encode than a not flat region. For example, a region of the video data may be determined to be a somewhat flat region when a representation of the texture and/or spatial frequency (e.g., a complexity value) is greater than a first threshold and less than a second threshold.

Figure 3:
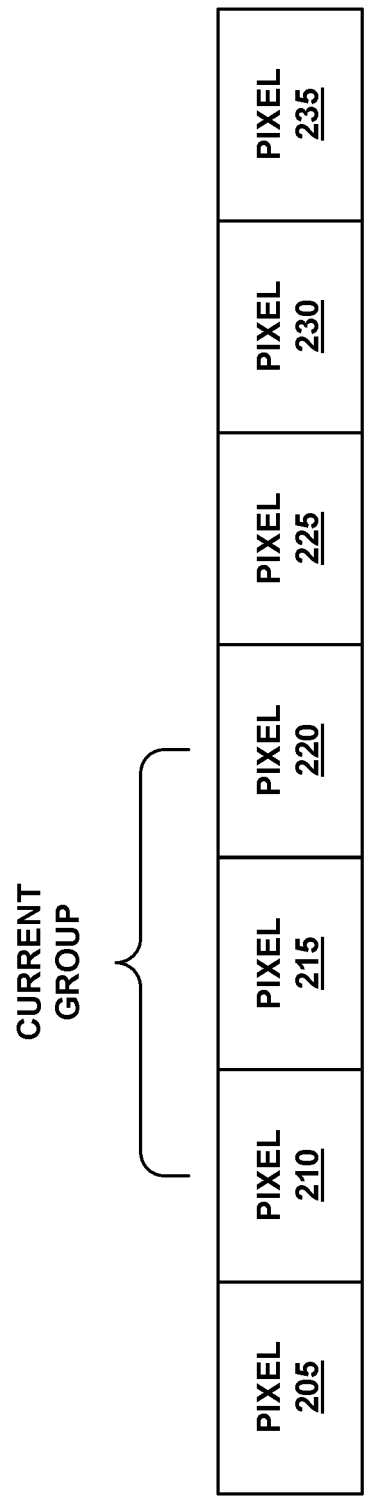
FIG. 3 is a block diagram illustrating an example of a number of pixels used in flatness detection methods in accordance with aspects described in this disclosure.

FIG. 3 illustrates the pixels involved in flatness determination for a current group of pixels according to an example. Referring to FIG. 3, a plurality of pixels 205 to 235 are shown. A current group of pixels is shown in FIG. 3 which includes pixels 210, 215, and 220. Pixel 205 is a pixel which is located before the current group. In other words, pixel 205 constitutes a previous pixel. Pixels 225, 230, and 235 are located after the current group. In other words, pixels 225, 230, and 235 constitute the next pixels.

The first flatness check may include two tests. In the first test for the very flat type of flatness, the minimum and maximum values for each color component are determined among the four samples including the previous pixel 205 and the pixels 210, 215, and 220 of the current group. If the difference between the maximum value and the minimum value of any color component is greater than $(2<<(\text{bitsPerComponent}-8))$, where $<<$ is the bitwise left shift operator, then the first test for very flat fails. If the difference between the maximum value and the minimum value of any color component is not greater than $(2<<(\text{bitsPerComponent}-8))$, then the first test passes, e.g., the current group of pixels is determined to have the very flat type of flatness.

In some embodiments, when the first test passes, the second test is not performed. In other embodiments, the second test is performed regardless of whether the first test passes or when the first test fails. In the second test for the somewhat flat type of flatness, if the difference between the maximum value and the minimum value of any color component among the four samples including the previous pixel 205 and the pixels 210, 215, and 220 is greater than a threshold, then the second test for somewhat flat fails. If the difference between the maximum value and the minimum value of any color component is not greater than the threshold, then the second test passes, e.g., the current group of pixels is determined to have the somewhat flat type of flatness. In certain implementations, the threshold used in the second test is calculated based on the QP.

If the above-described first and second tests in the first flatness check fail, then second flatness check is performed over the pixels in the current group and the next three pixels (i.e., for pixels 210 to 235). During the second flatness check, the minimum and maximum values of the pixels 210 to 235 are computed and the same two tests performed in the first flatness check are performed for the pixels 210 to 235.

Finally, each current group, e.g., pixels 210, 215 and 220, in the supergroup is classified as flat, somewhat flat or not flat based on the following procedure shown in pseudocode:

```
Loop over four groups in supergroup {
  If (!prevIsFlat && group is either very flat or somewhat flat)
    Current group and flatness type is signaled
  else
    prevIsFlat == 0
}
```

The value of prevIsFlat is initialized to 1 if the previous supergroup has a flatness indication; otherwise the value of prevIsFlat is initialized to 0. If a group within the supergroup is selected to be flat or somewhat flat, a flag (denoted as flatness_flag) for the supergroup is set to 1 and the corresponding group is signaled in the bit stream along with the associated flatness type. If no group is selected to be flat or somewhat flat, the flatness_flag for the supergroup is set to 0. At last, the rate controller 120 may adjust the QP value of the current group if the current group is found to be flat or somewhat flat.

There may be a number of limitations associated with the above-described flatness detection methods. For example, these methods may require the explicit signaling of whether the current block or group is flat or not-flat and may further require signaling the type of flatness, i.e., very flat or somewhat flat, when the current block or group is flat. The bits required for this explicit signaling may limit the achievable compression when implementing the above-described flatness detection methods.

Further, the above-described flatness detection method may not scale for the flatness detection of large group or block sizes (i.e., when the number of pixels in the group/block is relatively large). This is because the minimum and maximum values for larger groups or blocks may represent more extreme values and may fail to capture local spatial variations within the group.

Figure 4:
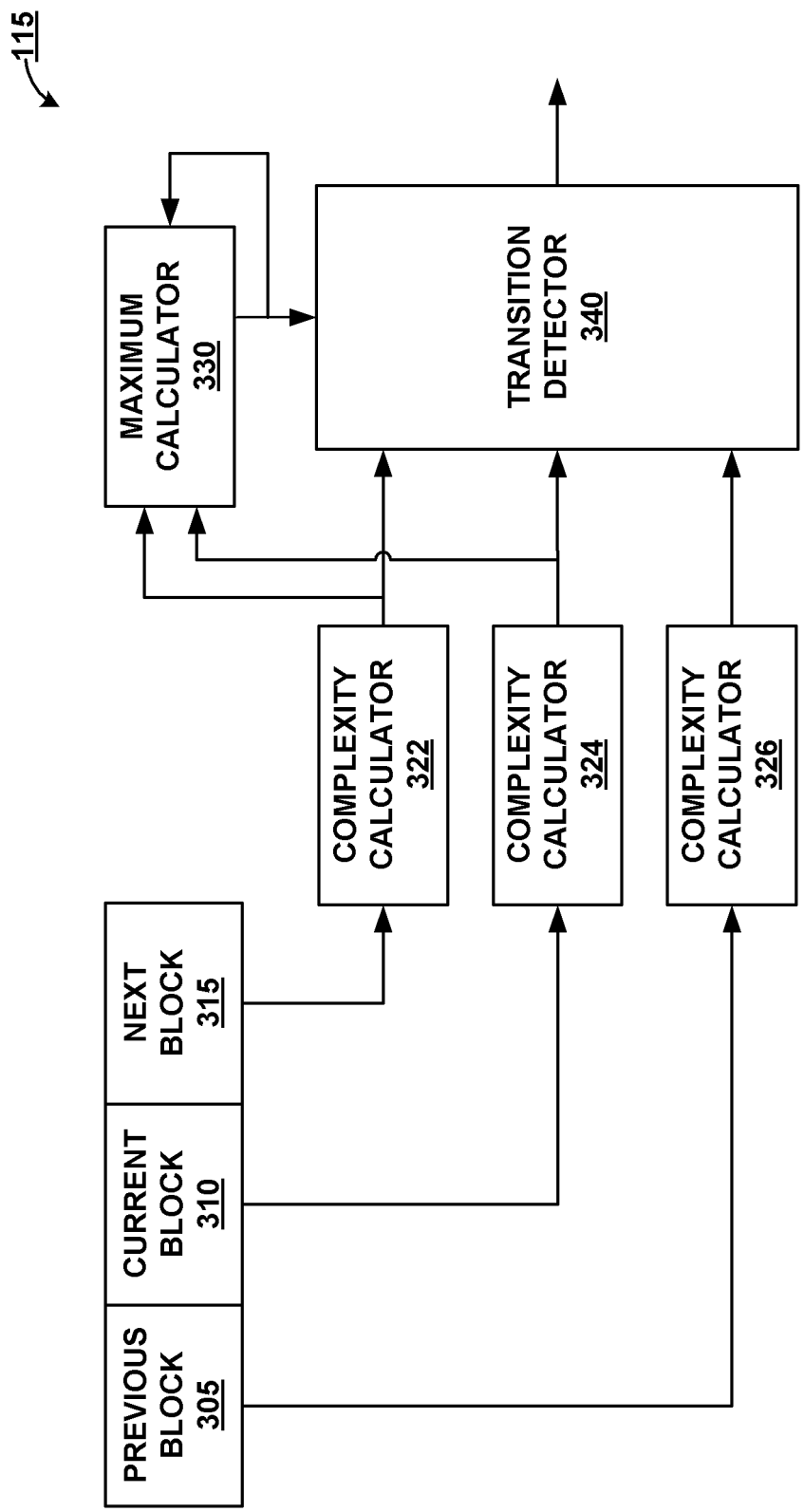
FIG. 4 is a block diagram illustrating an example of a flatness detector that may perform techniques in accordance with aspects described in this disclosure.

FIG. 4 is a block diagram illustrating the flatness detector 115 according to one embodiment. The flatness detector 115 may include three complexity calculators 332, 324, and 326, a maximum calculator 330 and a transition detector 340. The complexity calculators 332, 324, and 326 respectively calculate the complexities of the corresponding blocks. The complexity values calculated by the complexity calculators 332, 324, and 326 may be respectively representative of the texture and/or spatial frequency of the corresponding blocks. The flatness detector 115 may determine whether a transition from a non-flat region to a flat region occurs in a current block 310 based on a previous block 305 and a next block 315. Although the flatness detector 115 has been illustrated as including a number of separate blocks, depending on the embodiment, the blocks may be combined and/or implemented together or in various combinations.

As shown in FIG. 4, the complexities of the current, next and previous blocks 305, 310, and 315 are calculated by the respective complexity calculators 322, 324 and 326. The complexities of the current, next and previous blocks 305, 310, and 315 will be respectively denoted as $C_{cur}$, $C_{next}$, $C_{prev}$ hereinafter. The maximum calculator 330 calculates the maximum complexity, $C_{max}$, that has been identified thus far in the current line or slice. The transition detector 340 identifies the transition from a complex region to a flat region based on the calculated complexity values $C_{cur}$, $C_{next}$, $C_{prev}$ and $C_{max}$. In certain implementations, while encoding the first block in a line or slice, $C_{max}$ is initialized with the maximum between $C_{cur}$ and $C_{next}$. After encoding each and every block, the $C_{max}$ value is updated based on the maximum between $C_{max}$ and $C_{next}$. Finally, the QP value of the current block 310 is calculated based at least in part on the whether a transition from a complex region to a flat region has been identified in the current block 310 by the transition detector 340. In some implementations, the QP value is set to a relatively low value when a transition from a complex region to a flat region has been identified in the current block 310.

In one implementation, the maximum calculator 330 calculates the $C_{max}$ value independently for each line in a slice. That is, for the first block in each new line, the maximum calculator 330 initializes $C_{max}$ with the maximum between the $C_{cur}$ and $C_{next}$ and further updates $C_{max}$ based on the maximum of $C_{max}$ and $C_{next}$.

The complexity calculation for a selected block (i.e., the calculation performed by the complexity calculators 322, 324, and 326 for the respective previous, current and next blocks 305, 310, and 315) according to exemplary embodiments will now be described in more detail. The complexity value of the selected block is calculated by first applying a specific transformation to the selected block and then summing up the absolute values or absolute square values of the transform coefficients. In certain implementations, only the luma channel is used to calculate the complexity value and in other implementations, both the luma and chroma channels are used to calculate the complexity value. In one exemplary embodiment, the transformation applied to the selected block is a discrete cosine transform (DCT) or Hadamard transform. In another example, the complexity value may be derived based on the number of bits used to code the blocks and the respective QP value. In another example, the complexity value may be derived based on the residual energy between the original block and a predicted block.

In another exemplary embodiment, a subset of the transform coefficients generated by the application of the transform to the selected block are used in calculating the absolute sum or absolute square sum. In this embodiment, not all the transform coefficients in the block are used in calculating the absolute sum or absolute square sum.

In another exemplary embodiment, each transform coefficient is multiplied by a weight and the weights applied to the transform coefficients may be different from each other. In this embodiment, the absolute value or absolute square value of the weighted coefficients is calculated.

In yet another exemplary embodiment, a color transformation is applied to the block before calculating the transform coefficients.

In still another embodiment, for each color channel, the absolute or squared value of the subset of the respective transform coefficients are summed and the final sum is normalized. In this embodiment, the normalized sum of all the color channels are added together to generate the complexity value. In one implementation, the normalization includes dividing the accumulated value by the number of pixels in the selected block. In another implementation, before the dividing of the accumulated value by the number of pixels in the selected block, an offset value is added to the accumulated value in order to round the accumulated value to the nearest integer. For example, the offset value may be the number of pixels in the block divided by 2. It is noted that one or more of the above described embodiments or approaches to the complexity calculations may be combined.

In another embodiment, for each color channel, the absolute or squared value of the subset of the respective transform coefficients are summed and the final sum is normalized. The normalized sum of each color channel may be multiplied by a corresponding weight. The weighted normalized sums may then be added together to derive the complexity value. In one implementation, the input video data is in the RGB color-space and the color-space converter 105 converts the input video data into the YCgCo color-space. In this implementation, the weight for the Y-channel may be, for example, 1 and each of the weights for the chroma channels Co and Cg may be, for example, 0.5.

As described above, the transition detector 340 identifies whether a transition from a complex region to a flat region has occurred in the current block 310. In certain embodiments, the transition from a complex region to a flat region is identified by the transition detector 340 based at least in part on: (i) a first condition that is satisfied when the next block 315 is flat; and (ii) a second condition that is satisfied when the previous block 305 is complex. A number of implementations which illustrate when the conditions (i) and (ii) are satisfied are described in detail below. When both conditions (i) and (ii) are satisfied, the rate controller 120 adjusts the QP value of the current block 310 to a relatively low value. Otherwise if any one of the conditions fails, the rate controller 120 does not adjust the QP value of the current block 310 based on the output of the flatness detector 115.

In exemplary embodiments, the transition detector 340 will determine that condition (i) is satisfied if the following condition is true:

$$((C_{Cur}-C_{next})>C_{max}*T_1)\&\&(C_{next}<T_2*C_{max}),$$

where $T_1$ and $T_2$ are threshold parameters that are configurable.

In one implementation, the greater than conditional check in $((C_{cur}-C_{next})>C_{max}*T_1)$ is replaced with a greater than or equal to conditional check, i.e., $((C_{cur}-C_{next})\geq C_{max}*T_1)\&\&(C_{next}<T_2*C_{max})$.

In another implementation, the less than conditional check in $(C_{next}<T_2*C_{max})$ is replaced with a less than or equal to conditional check, i.e., $(C_{next}\leq T_2*C_{max})$.

In another implementation, the following condition is used $((C_{cur}-C_{next})\geq C_{max}*T_1)\&\&(C_{next}\leq T_2*C_{max})$ to determine whether condition (i) is satisfied.

In another exemplary embodiment, the condition (i) is satisfied if the following condition is true:

$$C_{next}<C_{Cur}*T,$$

where T is configurable threshold parameter.

In one implementation, the conditional check $C_{next}\leq C_{Cur}*T$ is used instead of the above conditional check to see if the condition (i) is satisfied.

In yet another exemplary embodiment, condition (ii) is satisfied if the following condition is true:

$$(C_{prev}>C_{max}*T_3),$$

where $T_3$ is a threshold parameter that is configurable.

In one implementation, the greater than conditional check in $(C_{prev}>C_{max}*T_3)$ is replaced with a greater than and equal to conditional check, i.e., $(C_{prev}\geq C_{max}*T_3)$.

In another exemplary embodiment, the condition (ii) is satisfied if $C_{prev}>T_4$, where $T_4$ is a configurable parameter.

In one implementation, the greater than conditional check $C_{prev}>T_4$ is replaced with a greater than and equal to conditional check, i.e., $C_{prev}\geq T_4$.

In yet another embodiment, the condition (ii) is evaluated based on the following algorithm:

```
for j = 1 to n
{
    if( C_next ≤ A[j])
    {
        if (C_prev > B[j])
        {
            condition (ii) is satisfied;
            break;
        }
    }
}
```

Here, $A=[a_1, a_2, \ldots, a_n]$, $B=[b_1, b_2, \ldots, b_n]$, where, $a_j$ and $b_j$ are configurable threshold values, for all values of j from 1 to n. Further 'n' represents a positive integer. In the above algorithm, as soon as it is found that the condition (ii) is satisfied, the algorithm is terminated via the break.

In one implementation, n is set to 1, and thus one threshold value is used in each of A and B.

In one implementation, the less than or equal to conditional check $(C_{next}\leq A[j])$ is replaced with a less than conditional check, i.e., $(C_{next}<A[j])$. In another implementation, the greater than conditional check $C_{prev}>B[j]$ is replaced with a greater than or equal to conditional check, i.e., $C_{prev}\geq B[j]$.

In one implementation, the threshold values $a_1, a_2, \ldots, a_n$ are in monotonically increasing order. In one implementation, the threshold values $b_1, b_2, \ldots, b_n$ are in monotonically increasing order.

In another implementation, the conditional check $C_{prev}\geq T_4$ and the above algorithm are combined to determine if the condition (ii) is satisfied.

In one implementation, the steps in the above algorithm are carried out at first to check if the condition (ii) is satisfied. If condition (ii) is not satisfied after completing the steps in this algorithm, the conditional check $C_{prev}>T_4$ is carried out.

In one implementation, the conditions (i) and (ii) are checked if the $C_{max}$ value is greater or greater than or equal to a threshold value $T_4$ which is configurable. That is, if the condition $(C_{max}>=T_4)$ is satisfied, the conditions (i) and (ii) are checked for detecting the transition from a non-flat region to a flat region. Otherwise, if the condition $(C_{max}>=T_4)$ is not satisfied, both the conditions (i) and (ii) are not checked and the QP value is not adjusted. In one implementation, the greater than or equal to conditional check is replaced with a strict greater than conditional check, i.e., $(C_{max}>T_4)$.

Figure 5:
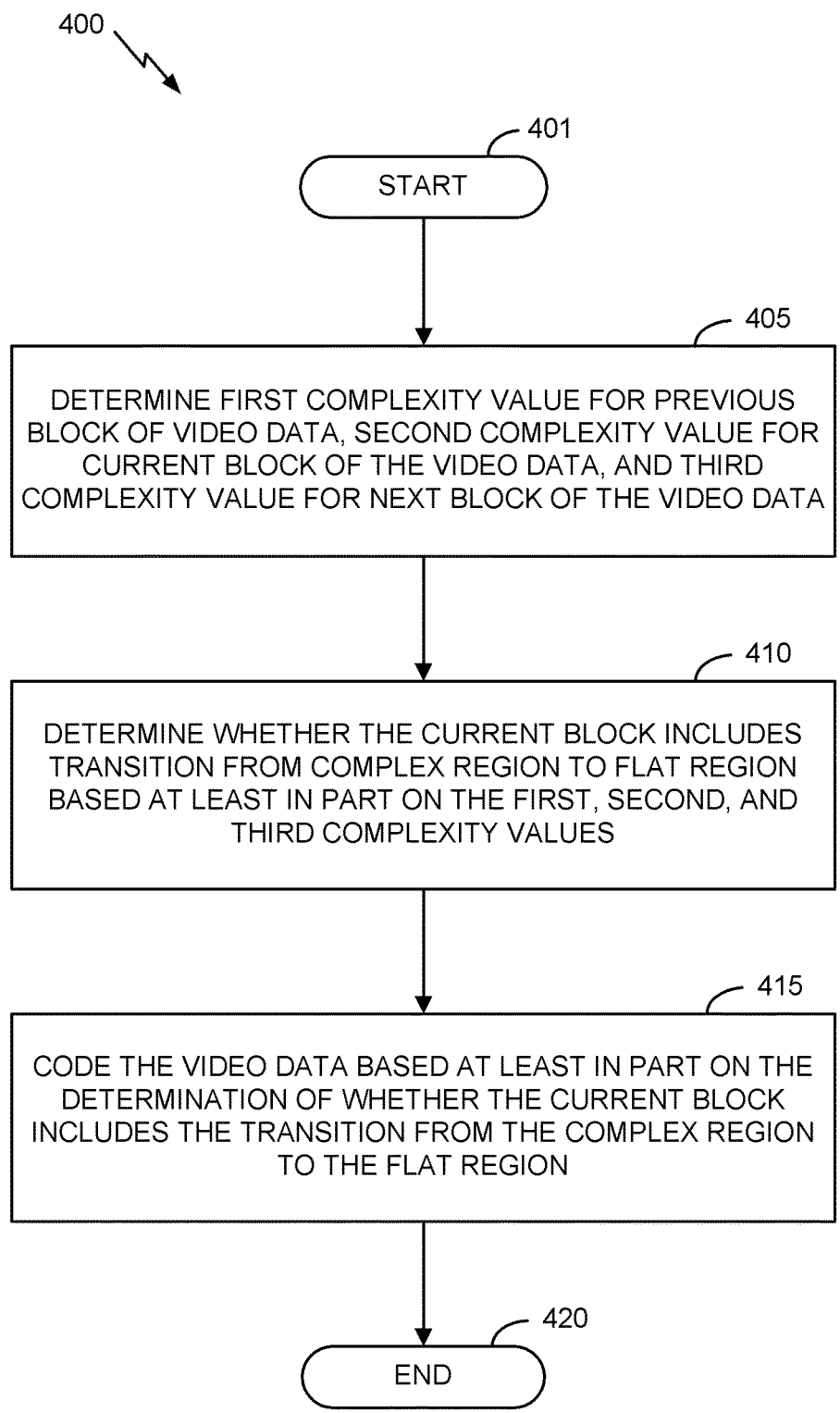
FIG. 5 is a flowchart illustrating a method for flatness detection in accordance with aspects described in this disclosure.

Example Flowchart for Identifying a Transition from a Complex Region to a Flat Region in Video Data With reference to FIG. 5, an example procedure for identifying a transition from a complex region to a flat region in video data will be described. FIG. 5 is a flowchart illustrating a method 400 for coding video data, according to an embodiment of the present disclosure. The steps illustrated in FIG. 5 may be performed by a video encoder (e.g., the video encoder 20 in FIG. 2A) or component(s) thereof. For convenience, method 400 is described as performed by a video coder (also simply referred to as coder), which may be the video encoder 20 or another component.

The method 400 begins at block 401. At block 405, the coder determines a first complexity value for a previous block of the video data, a second complexity value for a current block of the video data, and a third complexity value for a next block of the video data. The first, the second, and the third complexity values are representative of a texture and/or a spatial frequency of the corresponding one of the previous block, the current block, and the next blocks of the video data. In some embodiments, each of the first, second, and third complexity values may be calculated by generating a plurality of transform coefficients via applying a transform to the corresponding one of the previous, current, and next blocks. In these embodiments, each of the complexity values corresponding to the previous, current, and next blocks is determined via summing the absolute values or the absolute square values of the transform coefficients.

At block 410, the coder determines whether the current block includes a transition from a complex region to a flat region based on the first, second, and third complexity values. The complex region has a complexity value that meets or exceeds a complexity threshold and the flat region has a complexity value that is less than the complexity threshold. In some embodiments, the coder further determines a maximum complexity value for a current slice of the video data. The coder may also determine whether a first condition is satisfied based at least in part on the third complexity value and determine whether a second condition is satisfied based at least in part on the first complexity value in order to determine whether the current block includes a transition from a complex region. At block 415, the coder codes the video data based at least in part on the determination of whether the current block includes the transition from the complex region to the flat region. The method ends at block 420.

In the method 400, one or more of the blocks shown in FIG. 5 may be removed (e.g., not performed) and/or the order in which the method is performed may be switched. In some embodiments, additional blocks may be added to the method 400. The embodiments of the present disclosure are not limited to or by the example shown in FIG. 5, and other variations may be implemented without departing from the spirit of this disclosure.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for coding video data, comprising:
    determining a first complexity value for a previous block of the video data, a second complexity value for a current block of the video data, and a third complexity value for a next block of the video data, the first, the second, and the third complexity values being representative of at least one of a texture or a spatial frequency of the corresponding one of the previous block, the current block, and the next block of the video data, the previous, the current, and the next blocks of the video data being consecutive in coding order and being located in a same slice;
    determining whether the current block includes a transition from a complex region to a flat region based at least in part on the first, the second, and the third complexity values, wherein complex regions have complexity values that meet or exceed a complexity threshold and flat regions have complexity values that are less than the complexity threshold;
    calculating a quantization parameter (QP) value for the current block based at least in part on the determination of whether the current block includes a transition from a complex region to a flat region; and
    coding the video data based at least in part on the calculated QP value.

2. The method of claim 1, wherein the determining the first, second, and third complexity values comprises:
    selecting one of the previous, current, and next blocks;
    calculating a plurality of transform coefficients via applying a transform to the selected block; and
    determining the complexity value corresponding to the selected block via summing the absolute values or the absolute square values of the transform coefficients.

3. The method of claim 2, wherein the determining the first, second, and third complexity values further comprises applying a color transform to the selected block before the calculating the plurality of transform coefficients.

4. The method of claim 1, wherein the determining the complexity value for each of the previous, current, and next blocks comprises:
    calculating a plurality of transform coefficients via applying a transform to a corresponding block;
    summing the absolute value or the absolute square value of a subset of the transform coefficients for each color channel;
    normalizing the sum of the absolute value or the absolute square value for each color channel;
    applying a corresponding weight to the normalized sum of the absolute value or the absolute square value for each color channel; and
    determining the complexity value of the corresponding block via summing the weighted normalized sum for each of the color channels.

5. The method of claim 1, further comprising determining a maximum complexity value for a current slice of the video data, wherein the determining whether the current block includes the transition from the complex region to the flat region is further based on the maximum complexity value.

6. The method of claim 5, wherein the determining the maximum complexity value for the current slice of the video data comprises:
    when the previous block is a first block in the current slice and the current block is a second block in the current slice, initializing the maximum complexity value to a maximum value between the first and second complexity values; and
    updating the maximum complexity value to a maximum value between the maximum complexity value and the third complexity value.

7. The method of claim 1, wherein the determining whether the current block includes the transition from the complex region to the flat region comprises:
    determining whether a first condition is satisfied based at least in part on the third complexity value for the next block; and
    determining whether a second condition is satisfied based at least in part on the first complexity value for the previous block.

8. The method of claim 7, wherein the first condition is satisfied when the following condition is true:

$$((C_{Cur}-C_{next})>C_{max}*T_1)\&\&(C_{next}<T_2*C_{max}),$$

where $C_{Cur}$ is the second complexity value, $C_{next}$ is the third complexity value, $C_{max}$ is the maximum complexity value, and $T_1$ and $T_2$ are first and second threshold values.

9. The method of claim 7, wherein the determining whether the second condition is satisfied comprises:
    determining whether the third complexity value is less than or equal to a third threshold value;
    determining whether the first complexity value is greater than a fourth threshold value; and
    determining that the second condition is satisfied when the third complexity value is less than or equal to the third threshold value and the first complexity value is greater than the fourth threshold value.

10. A device for coding video data, comprising:
    a memory configured to store the video data; and
    a processor in communication with the memory and configured to:
        determine a first complexity value for a previous block of the video data, a second complexity value for a current block of the video data, and a third complexity value for a next block of the video data, the first, the second, and the third complexity values being representative of at least one of a texture or a spatial frequency of the corresponding one of the previous block, the current block, and the next block of the video data the previous, the current, and the next blocks of the video data being consecutive in coding order and being located in a same slice;
        determine whether the current block includes a transition from a complex region to a flat region based at least in part on the first, second, and third complexity values, wherein complex regions have complexity values that meet or exceed a complexity threshold and the flat regions have complexity values that are less than the complexity threshold;
        calculate a quantization parameter (QP) value for the current block based at least in part on the determination of whether the current block includes a transition from a complex region to a flat region; and
code the video data based at least in part on the calculated QP value.

11. The device of claim 10, wherein the processor is further configured to:
select one of the previous, current, and next blocks;
calculate a plurality of transform coefficients via applying a transform to the selected block; and
determine the complexity value corresponding to the selected block via summing the absolute values or the absolute square values of the transform coefficients.

12. The device of claim 11, wherein the processor is further configured to apply a color transform to the selected block before the calculating the plurality of transform coefficients.

13. The device of claim 10, wherein the processor is further configured to:
calculate a plurality of transform coefficients via applying a transform to a corresponding block;
sum the absolute value or the absolute square value of a subset of the transform coefficients for each color channel;
normalize the sum of the absolute value or the absolute square value for each color channel;
apply a corresponding weight to the normalized sum of the absolute value or the absolute square value for each color channel; and
determine the complexity value of the corresponding block via summing the weighted normalized sum for each of the color channels.

14. The device of claim 10, wherein the processor is further configured to determine a maximum complexity value for a current slice of the video data, wherein the determining whether the current block includes the transition from the complex region to the flat region is further based on the maximum complexity value.

15. The device of claim 14, wherein the processor is further configured to:
when the previous block is a first block in the current slice and the current block is a second block in the current slice, initialize the maximum complexity value to a maximum value between the first and second complexity values; and
update the maximum complexity value to a maximum value between the maximum complexity value and the third complexity value.

16. The device of claim 10, wherein the processor is further configured to:
determine whether a first condition is satisfied based at least in part on the third complexity value for the next block; and
determine whether a second condition is satisfied based at least in part on the first complexity value for the previous block.

17. The device of claim 16, wherein the first condition is satisfied when the following condition is true:

$$((C_{Cur}-C_{next})>C_{max}*T_1)\&\&(C_{next}<T_2*C_{max}),$$

where $C_{Cur}$ is the second complexity value, $C_{next}$ is the third complexity value, $C_{max}$ is the maximum complexity value, and $T_1$ and $T_2$ are first and second threshold values.

18. The device of claim 16, wherein the processor is further configured to:
determine whether the third complexity value is less than or equal to a third threshold value;
determine whether the first complexity value is greater than a fourth threshold value; and
determine that the second condition is satisfied when the third complexity value is less than or equal to the third threshold value and the first complexity value is greater than the fourth threshold value.

19. An apparatus, comprising:
means for determining a first complexity value for a previous block of video data, a second complexity value for a current block of the video data, and a third complexity value for a next block of the video data, the first, the second, and the third complexity values being representative of at least one of a texture or a spatial frequency of the corresponding one of the previous block, the current block, and the next block of the video data the previous, the current, and the next blocks of the video data being consecutive in coding order and being located in a same slice;
means for determining whether the current block includes a transition from a complex region to a flat region based at least in part on the first, second, and third complexity values, wherein complex regions have complexity values that meet or exceed a complexity threshold and flat regions have complexity values that are less than the complexity threshold; and
means for calculating a quantization parameter (QP) value for the current block based at least in part on the determination of whether the current block includes a transition from a complex region to a flat region.

20. The apparatus of claim 19, wherein the means for determining the first, second, and third complexity values comprises:
means for selecting one of the previous, current, and next blocks;
means for calculating a plurality of transform coefficients via applying a transform to the selected block; and
means for determining the complexity value corresponding to the selected block via summing the absolute values or the absolute square values of the transform coefficients.

21. The apparatus of claim 20, wherein the means for determining the first, second, and third complexity values further comprises means for applying a color transform to the selected block before the calculating the plurality of transform coefficients.

22. The apparatus of claim 19, wherein the means for determining the complexity value for each of the previous, current, and next blocks comprises:
means for calculating a plurality of transform coefficients via applying a transform to a corresponding block;
means for summing the absolute value or the absolute square value of a subset of the transform coefficients for each color channel;
means for normalizing the sum of the absolute value or the absolute square value for each color channel;
means for applying a corresponding weight to the normalized sum of the absolute value or the absolute square value for each color channel; and
means for determining the complexity value of the corresponding block via summing the weighted normalized sum for each of the color channels.

23. The apparatus of claim 19, further comprising means for determining a maximum complexity value for a current slice of the video data, wherein the determining whether the current block includes the transition from the complex region to the flat region is further based on the maximum complexity value.

24. The apparatus of claim 23, wherein the means for determining the maximum complexity value for the current slice of the video data comprises:
- means for initializing the maximum complexity value to a maximum value between the first and second complexity values when the previous block is a first block in the current slice and the current block is a second block in the current slice; and
- means for updating the maximum complexity value to a maximum value between the maximum complexity value and the third complexity value.

25. A non-transitory computer readable storage medium having stored thereon instructions that, when executed, cause a processor of a device to:
- determine a first complexity value for a previous block of video data, a second complexity value for a current block of the video data, and a third complexity value for a next block of the video data, the first, the second, and the third complexity values being representative of at least one of a texture or a spatial frequency of the corresponding one of the previous block, the current block, and the next block of the video data the previous, the current, and the next blocks of the video data being consecutive in coding order and being located in a same slice;
- determine whether the current block includes a transition from a complex region to a flat region based at least in part on the first, second, and third complexity values, wherein complex regions have complexity values that meet or exceed a complexity threshold and flat regions have complexity values that are less than the complexity threshold; and
- calculate a quantization parameter (QP) value for the current block based at least in part on the determination of whether the current block includes a transition from a complex region to a flat region.

26. The non-transitory computer readable storage medium of claim 25, further having stored thereon instructions that, when executed, cause the processor to:
- select one of the previous, current, and next blocks;
- calculate a plurality of transform coefficients via applying a transform to the selected block; and
- determine the complexity value corresponding to the selected block via summing the absolute values or the absolute square values of the transform coefficients.

27. The non-transitory computer readable storage medium of claim 26, further having stored thereon instructions that, when executed, cause the processor to apply a color transform to the selected block before the calculating the plurality of transform coefficients.

28. The non-transitory computer readable storage medium of claim 25, further having stored thereon instructions that, when executed, cause the processor to:
- calculate a plurality of transform coefficients via applying a transform to a corresponding block;
- sum the absolute value or the absolute square value of a subset of the transform coefficients for each color channel;
- normalize the sum of the absolute value or the absolute square value for each color channel;
- apply a corresponding weight to the normalized sum of the absolute value or the absolute square value for each color channel; and
- determine the complexity value of the corresponding block via summing the weighted normalized sum for each of the color channels.

* * * * *